United States Patent [19]

Ottens

[11] Patent Number: 4,668,391
[45] Date of Patent: May 26, 1987

[54] INSTALLATION FOR DEHYDRATING PROTEIN-CONTAINING SLUDGE

[76] Inventor: Erroll P. K. Ottens, Geuzenerbrink 2, 7812 NV, Emmen, Netherlands

[21] Appl. No.: 709,198

[22] Filed: Mar. 7, 1985

[51] Int. Cl.$^4$ .......................................... B01D 17/028
[52] U.S. Cl. ................... 210/181; 210/221.2; 210/260; 210/297; 210/401; 210/512.1
[58] Field of Search ............... 210/770, 771, 787, 788, 210/220, 304, 305, 521, 221.2, 512.1, 181, 187, 207, 221.1, 248, 251, 252, 260, 297, 400, 401, 905; 159/2.1, 16.3

[56] References Cited

U.S. PATENT DOCUMENTS

| | | | |
|---|---|---|---|
| 3,337,051 | 8/1967 | Kerschner | 210/304 |
| 3,738,488 | 6/1973 | Hondermark | 210/787 |
| 3,754,658 | 8/1973 | Messing | 210/304 |
| 3,784,009 | 1/1974 | Maciula | 210/304 |
| 3,985,522 | 10/1976 | Kuhlmann | 210/304 |
| 4,017,390 | 4/1977 | Vicard | 210/304 |
| 4,057,496 | 11/1977 | Itagaki | 210/771 |
| 4,151,083 | 4/1979 | Dove | 210/787 |
| 4,225,325 | 9/1980 | Diehl et al. | 210/512.1 |
| 4,299,703 | 11/1981 | Bezard et al. | 210/512.1 |
| 4,334,962 | 6/1982 | Gerow | 159/2.1 |
| 4,336,101 | 6/1982 | Greenfield et al. | 159/16.3 |
| 4,364,833 | 12/1982 | Loegering | 210/521 |
| 4,517,091 | 5/1985 | Yamanaka et al. | 210/788 |
| 4,551,242 | 11/1985 | Mroz et al. | 210/512.1 |

Primary Examiner—Richard V. Fisher
Assistant Examiner—Wanda L. Millard
Attorney, Agent, or Firm—Watson, Cole, Grindle & Watson

[57] ABSTRACT

An apparatus for dehydrating protein containing aqueous slude, e.g., sludge produced in slaughter houses, which comprises an agglomerator positioned above a filter device, the agglomerator having a bottom wall, a cylindrical outer wall, a cylindrical inner wall, the inner wall and the outer wall providing an annular space therebetween, a sludge inlet duct and a steam inlet duct, the sludge inlet duct and the steam inlet duct communicating with said annular space substantially diametrically opposite each other. The steam is injected in such a way that shear forces will be created in the liquid sludge, thus resulting in an improved precipitation of the proteins of the sludge. The steam is preferably injected tangentially with respect to the outer wall of the agglomerator and the annular space is preferably provided with a helically-extending baffle, the steam inlet extending parallel to the surface of a baffle turn. This provides an excellent precipitation of proteins in a continuous process. An outlet pipe is provided within the interior of the inner wall of the agglomerator and extends through the bottom wall, and a funnel-shaped element is connected between the outlet pipe and the upper edge of the inner wall.

7 Claims, 5 Drawing Figures

INSTALLATION FOR DEHYDRATING PROTEIN-CONTAINING SLUDGE

BACKGROUND OF THE INVENTION

1. Field of the Invention

The present invention relates to a dehydrating apparatus for dehydrating an aqueous sludge composition which can contain fats and proteins, and which is produced in installations for purifying waste water, and in particular to an agglomerator which can be employed in such a dehydrating apparatus.

2. Description of the Prior Art

In biochemical purifying installations the waste sludge is obtained as a so-called biomass which is substantially free of fat and has a relatively high ratio of proteins and minerals; in physicochemical purifying installations sludge is produced after adding chemicals which will give rise to a flocculation of soluble substances. Especially in slaughter houses, sludge is obtained which has a relatively high ratio of proteins and considerable quantities of fat.

The sludge obtained from installations for purifying waste water generally comprises a rather low dry substance ratio, e.g., ranging from 2 to 8%, so that it is uneconomical to sell the same as fodder, whilst dehydration by evaporation of the liquid present will be too expensive, as this will require too much energy.

Thus, processes and installations have recently been proposed for increasing the dry substance ratio. These processes consist of a thermal conditioning, freezing of sludge, a sieve belt press and decantation or centrifugation.

These processes provide positive results. Moreover, new processes have been developed for anaerobic fermentation of sludge, thereby forming methane gas and a new sludge occupying a much smaller volume.

It appears that the separate use of each of the aforementioned methods is less attractive from an economical point of view, as regards investment costs, use of energy and production costs.

SUMMARY OF THE INVENTION

It is primary object of the present invention to provide an agglomerator economically dehydrating sludge which requires a relatively low investment and use of only a small amount of energy.

This object is attained in accordance with the invention by means of an agglomerator for dehydrating an optionally fat-containing protein-comprising aqueous sludge composition obtained in installations for purifying waste water, comprising an outer vessel wall, a bottom and an inner vessel wall forming with the outer vessel wall an annular aqueous sludge composition treatment space, a sludge composition inlet and a heated gaseous fluid inlet opening in the annular space, an agglomerator outlet for removing treated sludge composition and means for creating shear forces in the aqueous sludge composition.

In this way already existing, coagulated protein agglomerates in the sludge are agglometated into larger agglomerates. Precipitation and dehydration of the latter agglomerates proceed in a very simple manner.

In a preferred embodiment the heated gaseous fluid is injected in such a way that the mixture to be treated will rotate along the gaseous fluid injection points, which rotation will create shear forces providing the desired agglomeration of the protein particles.

Preferably the heated gaseous fluid is injected tangentially, the heated gaseous fluid being steam.

If the initial sludge comprises fat, the agglomeration effect is generally improved, although the size of the agglomerates will not increase substantially. Free fatty acids and dissolved fats are mainly responsible for the increased binding effect between the protein particles.

If the sludge comprises a fat, the mass should be cooled to a temperature ranging from 20° to 25° C. prior to filtration. Due to this cooling, dissolved fats and fatty acids can be bonded to the previously obtained agglomerates. If a direct filtration is carried out, which involves higher temperatures, dissolved fats and fatty acids will be entrained with the filtrate, which is undesirable.

Agglomeration is preferably carried out by injecting a low pressure steam (1,03 tot 1,1 kg/cm$^2$) into the sludge over a short period of about 20 seconds.

The agglomeration of time, i.e., protein flakes or agglomerates as already present in the sludge, can be explained as follows.

Passing the steam vapor into the sludge, which, e.g., causes a temperature rise, will involve a change of the surface structure of the protein flakes or agglomerates present, so that the flakes or agglomerates will tend to stick to each other and form larger flakes or agglomerates under the influence of the rotating movement or shear forces occuring, which larger flakes are more easily dehydrated. The presence of a stirring means or other additional means to effect the rotation, is not essential, the more so as such additional mechanical means will decrease the size of the formed agglomerates.

The agglomeration may simply be effected by an injection velocity of a gaseous fluid, preferably steam, ranging from 60 to 80 m/sec at the injection points or openings.

The agglomeration may both be effected in a discontinuous or continuous manner.

In a continuous agglomeration process fresh sludge and gaseous fluid are simultaneously passed into a cylindrical agglomerator. The agglomerated sludge can then leave the agglomeration vessel through an overflow. The average residence time of the sludge in the vessel or reactor should amount to approximately 20 seconds.

After agglomeration of protein-containing sludge, the mass may be filtered through a conventional sieve filter belt. The filtrate is clear and has a relatively high temperature of approximately 90°.

The process executed with an agglomerator in accordance with the invention may be optimized in an energetical manner by performing the dehydration in three subsequent steps if the dry substance contents of the final sludge is comprised between 35 and 50%.

Should the sludge be dehydrated to a dry substance contents ranging from approximately 80 to 95%, a fourth subsequent step can be performed. The aforementioned three subsequent treatments of sludge being partically free from fat, comprise the following steps:

(1) preheating the sludge to a temperature of about 70° C.;

(2) agglomeration of the sludge by means of a direct injection of a heated gaseous fluid preferably steam and a simultaneous rotation of the mass along the steam injection points or openings, thus providing shear forces;

(3) filtration of the sludge agglomerates, the obtained filtrate having a high temperature being used for preheating the sludge in the first step.

If the sludge has to be dehydrated to a higher extent, the fourth step is:

(4) dehydrating the sludge by blowing hot air into the sludge or providing a good contact of the sludge as filtered, and air.

In case a separate protein-comprising sludge and a separate fat-comprising sludge can be recovered during a chemicophysical purification, preferably only the protein-comprising sludge should be subjected to the aforementioned four steps, whilst the fat which can be thickened by means of exhaust drying air from the dryer (fourth step), is added after having dried the protein-comprising sludge.

If a combined protein and fat-comprising sludge is obtained during a chemicophysical purification, the agglomerated sludge first has to be cooled to a temperature comprised between, e.g., 20° and 25° C., so as to solidify the fat which has become liquid, as otherwise liquid fat would for the greater part leave the installation through the filtrate of the sludge agglomerate filtration.

In order to obtain pre-coagulated protein-containing sludge, additives such as ferrichloride or polyelectrolytes are advantageously added to a protein-containing waste liquid, thus causing the proteins to flocculate or to pre-coagulate. The flocculated or pre-coagulated proteins forming an emulsion will not precipitate without the use of the apparatus in accordance with the present invention.

Until now the flocculated proteins were recovered by floatation, whereupon the floating protein layer was removed. This method has the drawback of being very expensive.

DESCRIPTION OF THE PREFERRED EMBODIMENTS

Figure 3:
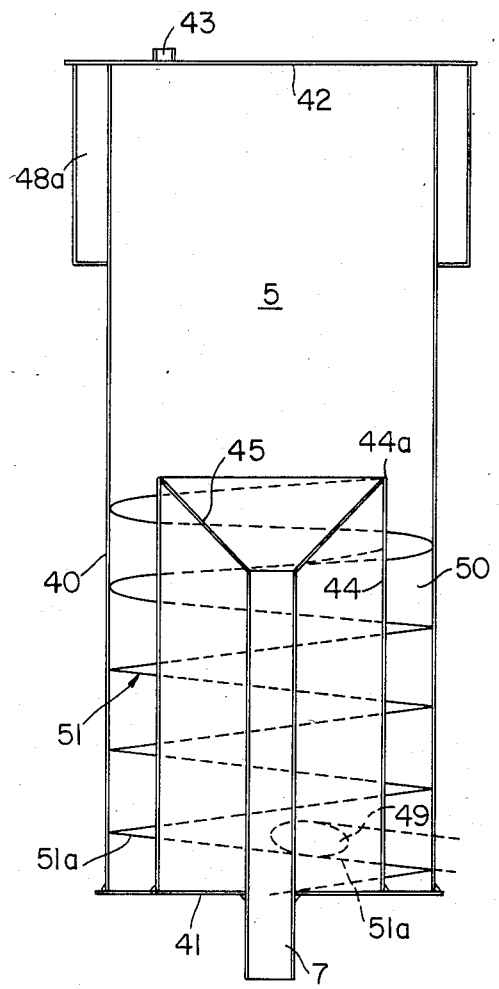
FIG. 3 a cross section according to line III—III in FIG. 2.
Figure 2:
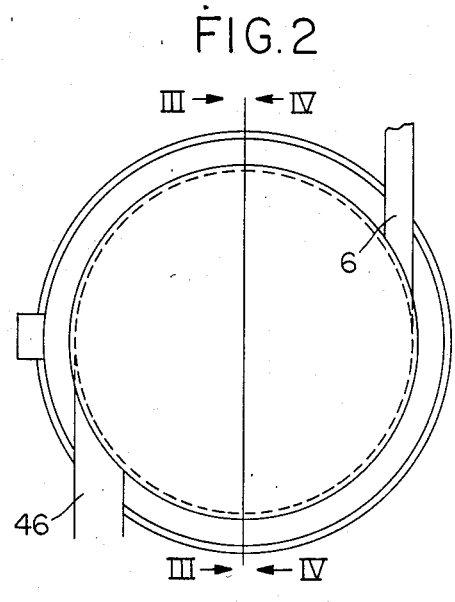
FIG. 2 a view from the lower side of the agglomerator according to the invention.
Figure 1:
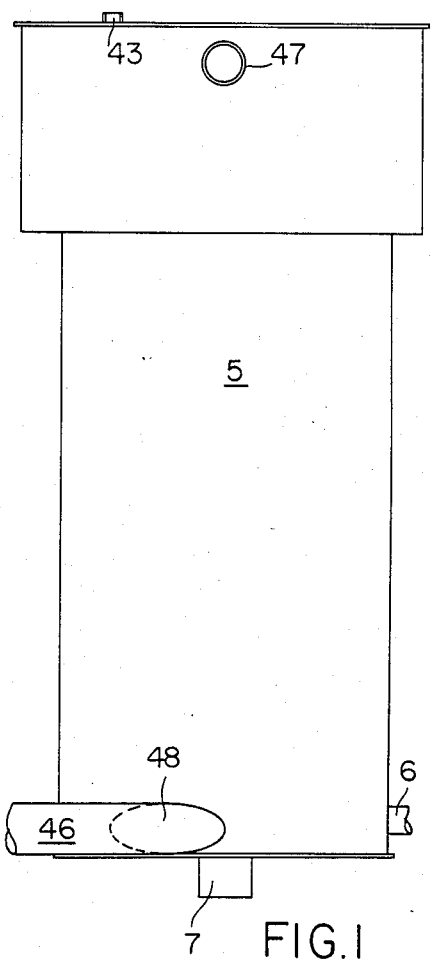
FIG. 1 shows a side view of an agglomerator according to the invention.
Figure 4:
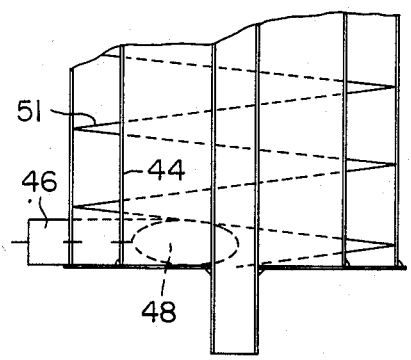
FIG. 4 a cross section according to line IV—IV in FIG. 2.
Figure 5:
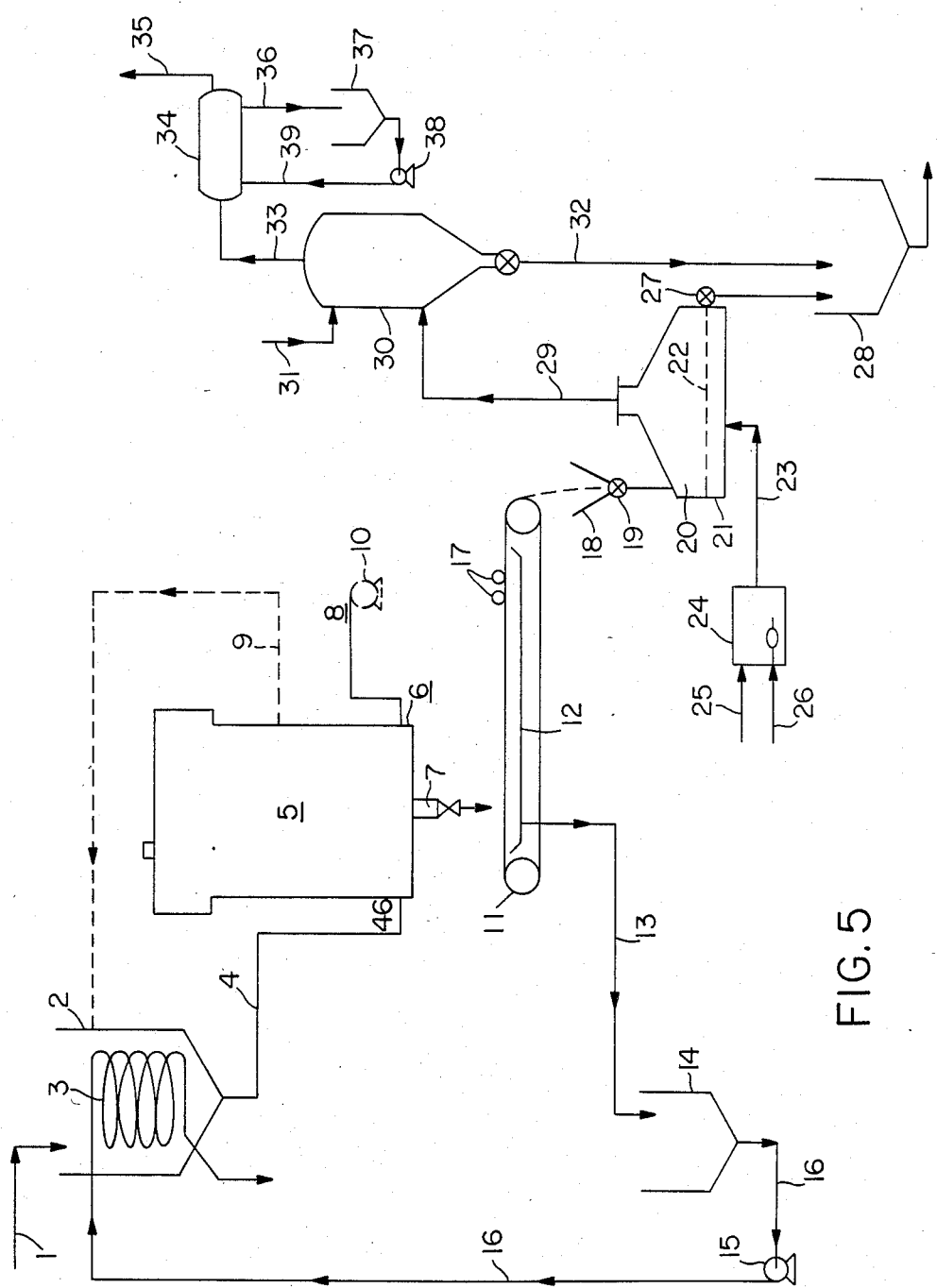
FIG. 5 shows an apparatus for processing and dehydrating protein-containing sludge which includes an agglomerator according to the invention.

Referring first to FIG. 5, a protein-containing liquid sludge from a physicochemical plant for the purification of waste water of a slaughter house is passed into a container 2 through a conduit 1, starting from a sludge source (not shown in FIG. 5). The container 2 comprises a heat exchanger 3 for heating the sludge to a temperature between 60° and 70° C.

The container 2 may advantageously be provided with a double wall for passing a heated aqueous fluid, which may, e.g., consist of filtration water obtained in a step to be described later on.

Depending on the dry substance concentration in the sludge, it may be recommended to provide the container 2 with a stirring means for stirring the sludge mixture.

From container 2 the sludge is conveyed to an agglomerator 5 through conduit 4, connected with the sludge inlet 46 for precoagulated sludge from container 2.

The agglomerator 5 is filled and steam is injected, so that an agglomeration of the proteins is initiated. The agglomerated liquid sludge is conveyed to an endless belt filter 11, through an agglomerator outlet pipe 7. The endless filter belt is movably mounted between two horizontally spaced apart support rollers. A container 14 is positioned between the support rollers and the upper and lower runs of the endless filter belt.

Steam is tangentially injected into the bottom part of the agglomerator 5 through a steam inlet 6, the steam velocity at the injection point ranging from 60 to 80 m/sec.

This tangential injection creates shear forces in the sludge material. The applied steam is a low pressure steam having a pressure comprised between 1.03 and 1.1 $kg/cm^2$.

During a short period of time of 20 seconds the proteins are sufficiently heated, thus causing these proteins to agglomerate and to easily precipitate.

The introduction of steam also provides the advantage that a pasteurization occurs, which prevents any bacteriological problems during further processing.

Agglomerator 5 may comprise a cooling spiral or a double wall, thus permitting cooling of the agglomerated mass. This is particularly important if the starting material comprises considerable quantities of fat.

The discharged cooling water can be pumped through circuit 9 to the heat exchanger 3 of the sludge container 2. The pump 10 can supply steam through line 8 to the steam inlet 6. The filtrate obtained by processing the liquid with coagulated proteins is recovered in a container 12 and conveyed to a storage container 14, via a conduit 13, from which storage container the filtrate can be conveyed through conduit 16 to the heat exchanger 3 of the sludge container 2 by means of a pump 15.

The heat exchanger 3 or the double wall of container 2 are connected to the conduit 16.

The filter 11 may be provided with a plurality of pressure rollers 17 so as to press a considerable quantity of still adhering liquid out of the filtered sludge.

The filter cake is fed to a dryer 20 through a supply hopper 18 and a dual valve mechanism 19.

The dryer 20 consists of a housing 21, comprising a metal sheet 22, provided with perforations in the form of holes or slits.

Hot air is supplied through air channel 23 below metal sheet 22 and flows through the holes or slits of the metal sheet 22, thus causing a good contact between sludge to be dried and the hot air.

The air is preferably heated by means of an air heater 24, being fed with fuel through a conduit 26, and with air through a conduit 25.

The dryer 20 is preferably a shaking or vibration-bed-dryer, so that a controlled residence time division of the material to be dried can be obtained. Via a double valve mechanism, the dried material can be stored in a bunker and forms a suitable fodder material.

The exhaust air from dryer 20 can be discharged through an air conduit 29. If the material comprises considerable quantities of fat, moisture can be removed from the fat in a drying device 30, fat being supplied through a conduit 31, the heated gases required for the drying operation consisting of air from dryer 20 which has been used for drying the agglomerated proteins. Air being supplied through conduit 29 has a temperature of approximately 70° C.

The fat is supplied to the previously dried protein-containing sludge in bunker 28, via conduit 32. The exhaust air from the fat dryer 30 is discharged through conduit 33. If the latter exhaust air gives rise to possible environmental odor problems, the air can still be washed by injecting a liquid in the form of, e.g., a diluted sodium hypochlorite solution into the air washer 34. The liquid is passed into the air washer 34 through conduit 39 and is discharged through conduit 36, whilst the air is discharged through conduit 35. The liquid is recycled by means of a pump 38, through a recovering container 37.

The air washer may have the form of a hollow cylinder, comprising a plurality of spray nozzles directed to the direction of the air current.

By choosing the air velocity sufficiently small at the point of discharge of the air, drops can be caught in a very efficient manner.

FIG. 1 to FIG. 4 shows the agglomerator according to the invention in more detail.

The agglomerator 5 comprises a cylindrical outer wall 40, a bottom 41 and a cover 42. The cover 42 is provided with a gas outlet 43 for escape of used steam or other gases issueing from the waste water treated in the agglomerator 5.

An inner cylindrical wall 44 is accommodated in the lower part of the agglomerator 5 and this inner wall 44 forms a lower overflow 44a joining a frusto conical (funnel-shaped) element 45 which is connected with the agglomerator outlet pipe 7.

On the bottom 41 there is a sludge inlet duct 46 for liquid sludge to be treated and a steam inlet duct 6 for passing steam into the liquid so that liquid sludge is subjected to shear forces, these shear forces being obtained by injecting the heated steam tangentially with respect to the outer wall 40. This tangential direction of the steam will case a rotation of the liquid sludge, creating shear forces providing the desired agglomeration of protein particles present in the liquid sludge.

The sludge inlet duct 46 opens into the agglomerator through sludge inlet opening 48, which is substantially diametrically opposite the steam inlet duct opening 49 of steam inlet 6.

In a preferred embodiment the annular space 50 between walls 40 and 44 is provided with a helically-extending baffle 51 providing optimal shear forces.

The steam inlet duct 6 extends substantially parallel to the baffle surface part 51a of the helically-extending baffle 51 and the steam inlet opening 49 opens in the passage way above the baffle part (turn) 51a just above the sludge inlet opening 48.

The inlet duct 46 for liquid sludge is perpendicular to the outer wall 40 of the agglomerator 5 and opens in the lowest passage way between the bottom 41 and the first baffle part (turn) 51a and as the steam inlet opening 49 is in the passage way above the baffle part 51a.

The agglomerator may be provided with an upper annular space 48a for collecting droplets of liquids splashing up from the lower part of the agglomerator.

For cleaning the agglomerator a cleaning liquid may be introduced into the agglomerator through, e.g., inlet duct 46 and removed through an upper outlet 47.

The frustoconical elements 45 extends preferably at an angle of 45° with the inner wall 44.

The agglomerator 5 according to the invention provides an excellent residence time of the sludge to be treated and an excellent helical movement of the sludge.

In starting the process first sludge is introduced through sludge inlet duct 46 and then steam through steam inlet duct 6. The agglomerator outlet 7 is provided with a valve or lock.

Although the present invention has been shown and described in connection with two preferred embodiments, it will be apparent to those skilled in the art that many variations and modifications may be made without departing from the invention in its broader aspects. It is therefore intended to have the appended claims cover all such variations and modifications as fall within the true spirit and scope of the invention.

What claimed is:

1. An apparatus for treating an aqueous sludge which contains proteins, said apparatus including an agglomerator and a filter means positioned below said agglomerator, said agglomerator comprising
   a horizontally-oriented bottom wall,
   a vertically-oriented cylindrical outer wall mounted on said bottom wall,
   a vertically-oriented cylindrical inner wall mounted on said bottom wall and within said outer wall, said inner wall and said outer wall forming an annular treatment space therebetween,
   a first inlet opening in said outer wall to enable aqueous sludge to be tangentially supplied to said annular treatment space,
   sludge supply duct for supplying aqueous sludge to said first inlet opening,
   a second inlet opening in said outer wall diametrically opposite said first inlet opening to enable steam to be tangentially supplied to said annular treatment space,
   steam supply duct for supplying steam to said second inlet opening, and
   an outlet means extending through said bottom wall from within said inner wall to discharge treated sludge onto said filter means therebelow.

2. An apparatus as defined in claim 1, wherein said agglomerator includes a helically-extending baffle extending upwardly within said annular treatment space.

3. An apparatus as defined in claim 2, wherein said inner wall of said agglomerator extends vertically above said bottom wall less than said outer wall, the upper edge of said inner wall providing an overflow edge, and wherein said helically-extending baffle extends vertically upwardly from near said bottom wall to said overflow edge.

4. An apparatus as defined in claim 3, wherein said outlet means of said agglomerator comprises a lower pipe which extends through an opening in said bottom wall, and an upper funnel which is connected beween said lower pipe and said overflow edge.

5. An apparatus as defined in claim 2, wherein said sludge supply duct of said agglomerator extends perpendicularly to said outer wall.

6. An apparatus as defined in claim 2, wherein said steam supply duct of said agglomerator extends in parallel with a turn of said helically-extending baffle.

7. An apparatus as defined in claim 1, wherein said filter means comprises two horizontally spaced apart support rollers and an endless filter belt movably extending therebetween.

* * * * *